(12) United States Patent
Komiyama et al.

(10) Patent No.: US 7,862,951 B2
(45) Date of Patent: Jan. 4, 2011

(54) FUEL CELL AND FUEL CELL CONNECTOR

(75) Inventors: Ryuichi Komiyama, Machida (JP); Norishige Konno, Toyota (JP)

(73) Assignees: Toyota Jidosha Kabushiki Kaisha, Toyota-shi (JP); Tyco Electronics Japan G.K., Kawasaki-shi (JP)

( * ) Notice: Subject to any disclaimer, the term of this patent is extended or adjusted under 35 U.S.C. 154(b) by 1015 days.

(21) Appl. No.: 11/657,540

(22) Filed: Jan. 25, 2007

(65) Prior Publication Data

US 2008/0003482 A1    Jan. 3, 2008

(30) Foreign Application Priority Data

Jan. 25, 2006    (JP) .............. 2006-015804

(51) Int. Cl.
*H01M 8/24* (2006.01)
*H01R 9/24* (2006.01)

(52) U.S. Cl. ............... 429/468; 439/721; 439/722

(58) Field of Classification Search ............. 439/574, 439/575, 721, 722; 429/34, 468
See application file for complete search history.

(56) References Cited

U.S. PATENT DOCUMENTS

| | | | |
|---|---|---|---|
| 3,715,707 A * | 2/1973 | Anderson | 439/721 |
| 5,024,610 A | 6/1991 | French et al. | |
| 6,602,631 B1 * | 8/2003 | Cisar et al. | 429/34 |
| 6,844,093 B2 | 1/2005 | Kikuchi et al. | |
| 2005/0074655 A1 | 4/2005 | Ariyoshi et al. | |
| 2005/0233649 A1 * | 10/2005 | Siracki et al. | 439/721 |

FOREIGN PATENT DOCUMENTS

| | | |
|---|---|---|
| JP | 2002-313399 | 10/2002 |
| JP | 2003-109649 | 4/2003 |
| JP | 2004-127776 | 4/2004 |
| JP | 2006-216486 | 8/2006 |

* cited by examiner

*Primary Examiner*—Stephen J. Kalafut
(74) *Attorney, Agent, or Firm*—Kenyon & Kenyon LLP (57) ABSTRACT

A connecter comprises a housing having a first projection formed on an upper half of a first lateral surface over the entire width thereof between the front surface and the rear surface, and a second projection formed on a lower half of a second lateral surface opposed to the first lateral surface; a single detection terminal mounted inside the first projection, capable of connection to an electrode of a single cell contained in a fuel cell; and a detection terminal mounted in the lower half of the housing, capable of connection to the electrode of the single cell contained in the fuel cell. The detection terminals are all arranged at equal intervals.

6 Claims, 14 Drawing Sheets

Related Art

Related Art

Fig. 14

FUEL CELL AND FUEL CELL CONNECTOR

CROSS-REFERENCE TO RELATED APPLICATION

This application claims priority to Japanese Patent Application No. 2006-015804, filed on Jan. 25, 2006.

BACKGROUND OF THE INVENTION

1. Field of the Invention

The present invention relates to a fuel cell and a fuel cell connecter.

2. Description of the Related Art

A fuel cell mounted in an electric or hybrid vehicle or the like is formed by stacking a large number of electric power generation units, each referred to as a cell (a single cell), into numerous layers. Each of the single cells comprises an electrolyte membrane made of an ion exchange membrane which is sandwiched by an anode and a cathode on the respective sides and further by a pair of separator on both outer sides thereof. A path is defined on the separator for supplying fuel gas, such as hydrogen gas, and oxidant gas, such as oxygen gas, to the anode and the cathode, respectively. Fuel and oxidant gases supplied through the path cause chemical reaction inside the cell, which generates power.

Figure 12:
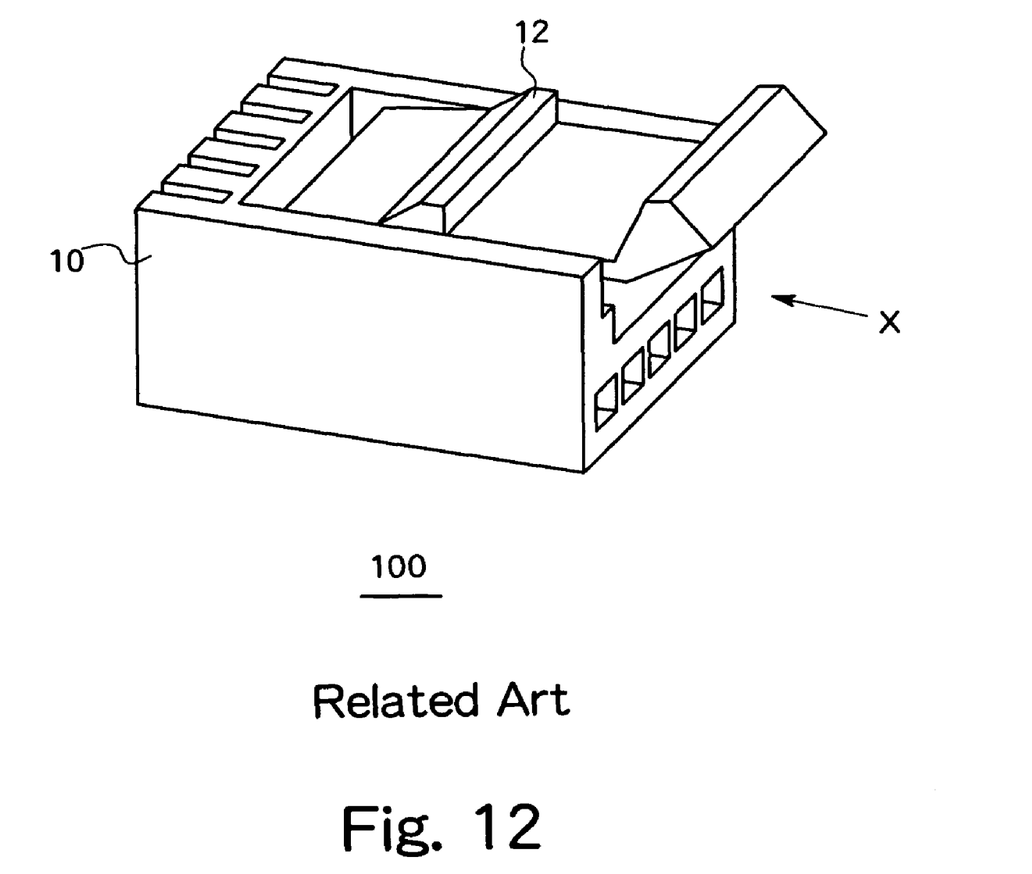
FIG. 12 is a perspective view showing an external appearance of a connecter according to background art.
Figure 13:
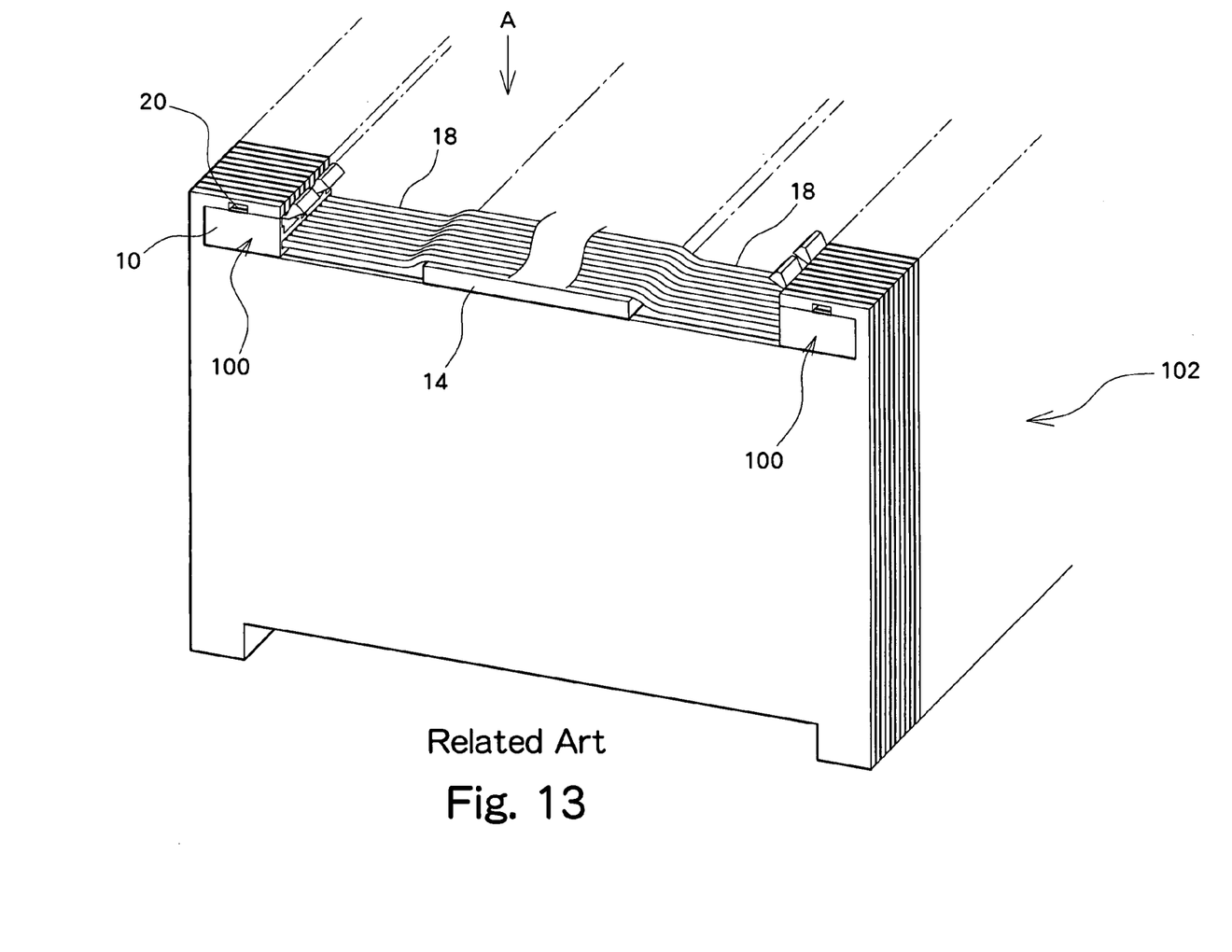
FIG. 13 is a perspective view of a fuel cell with a connecter according to background art mounted therein.

For such a fuel cell, management of the power generation state for each single cell is necessary in order to control the amounts of supplied fuel and oxidant gases and to find a faulty cell. To enable such management, the generation voltage for each single cell is monitored so that the control is carried out based on the monitored generation voltage. Generally, a connecter 100 having a housing 10, as shown in FIG. 12, inside which detection terminals are arranged at intervals equal to those of the plurality of stacked single cells, is employed. The connecter 100 has an engagement portion 12 for locking defined on the upper part thereof. The connecter 100 is mounted in the fuel cell 102, as shown in FIG. 13.

The fuel cell 102 has a hook portion 20 for locking the connecter 100, each formed along each side edge of the top surface A thereof. With the connecter 100 inserted into the hook portion 20 from the lateral side thereof, the engagement portion 12 of the connecter 100 is brought into engagement with the hook portion 20, and is thereby fixed to the fuel cell 102. Consequently, the detection terminals incorporated in the connecter 100 are brought into electrical connection with the separators of the single cells of the fuel cell 102.

The fuel cell 102 additionally has a tension plate 14 formed along the central portion on the top surface A thereof, which extends in the direction in which the single cells are stacked. An electrical wire 18 connected to each of the detection terminals in the connecter 100 is fixed to the tension plate 14, so that the electrical wire 18 is strung over the top surface A of the fuel cell 102. Connecting these electrical wires 18 to the voltage sensor, or the like, enables measurement of a potential difference between the separators of each single cell.

Here, the electrode of the fuel cell to which the detection terminal in the connecter is to be connected is made of carbon. When a carbon electrode is employed, each single cell must be formed relatively thicker in consideration of the need to provide sufficient structural strength or the like. However, there is an increasing demand for thinner single cells in conjunction with the recent improvement in efficiency of power generation by a singe cell used in a fuel cell, and power generation by a thinner single cell becoming possible.

Figure 14:
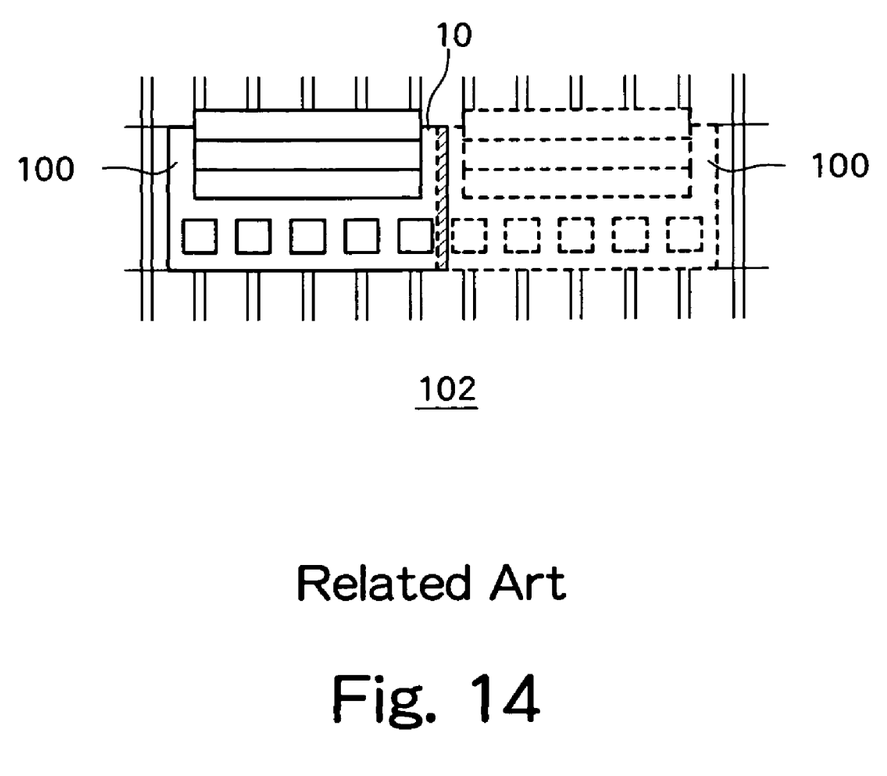
FIG. 14 is a rear side view of the full cell with a connecter mounted therein according to background art.

FIG. 14 illustrates a problem with thinner cells. Specifically, FIG. 14 shows the connecters 100, viewed from the rear side thereof, or the X side (the side indicated by the arrow X in FIG. 12), relative to the connecter insertion direction. As shown in FIG. 14, use of a thinner single cell results in generation of an region where the housings 10 of the adjacent connecters 100 spatially interfere with each other (the hatched portion in FIG. 14). This hinders the connecters 100 from being mounted such that all of the single cells of the fuel cell are connected to the detection terminals of the connecters 100.

Meanwhile, when the outer wall of the housing is formed thinner to thereby avoid such interference, insufficient structural strength of the connecter is resulted. This leads to problems of a drop in manufacturing efficiency of the connecter and connectors being damaged or broken during installation on the fuel cell.

As another measure to avoid interference between connecters, a structure in which detection terminals are provided alternately in upper and lower halves of the housing is considered. Such a structure, however, cannot satisfy the demand for a lower profile of the connecter for ensuring the smallest possible size of the fuel cell with a connecter mounted therein.

SUMMARY OF THE INVENTION

The present invention relates to a connecter for connecting an electrical wire to each of the electrodes of all single cells contained in a fuel cell formed by stacking a plurality of single cells.

According to one aspect of the present invention, there is provided a connecter comprising a housing having a first projection formed on an upper half of a first lateral surface and a second projection formed on a lower half of a second lateral surface opposed to the first lateral surface; a single detection terminal mounted inside the first projection, capable of connection to the electrode of the single cell contained in the fuel cell; and at least one detection terminal mounted in the lower half of the housing, capable of connection to the electrode of the single cell contained in the fuel cell.

BRIEF DESCRIPTION OF THE DRAWINGS

Embodiments of the present invention will be described in detail with reference to the following figures, wherein.

DESCRIPTION OF THE PREFERRED EMBODIMENT

Figure 1:
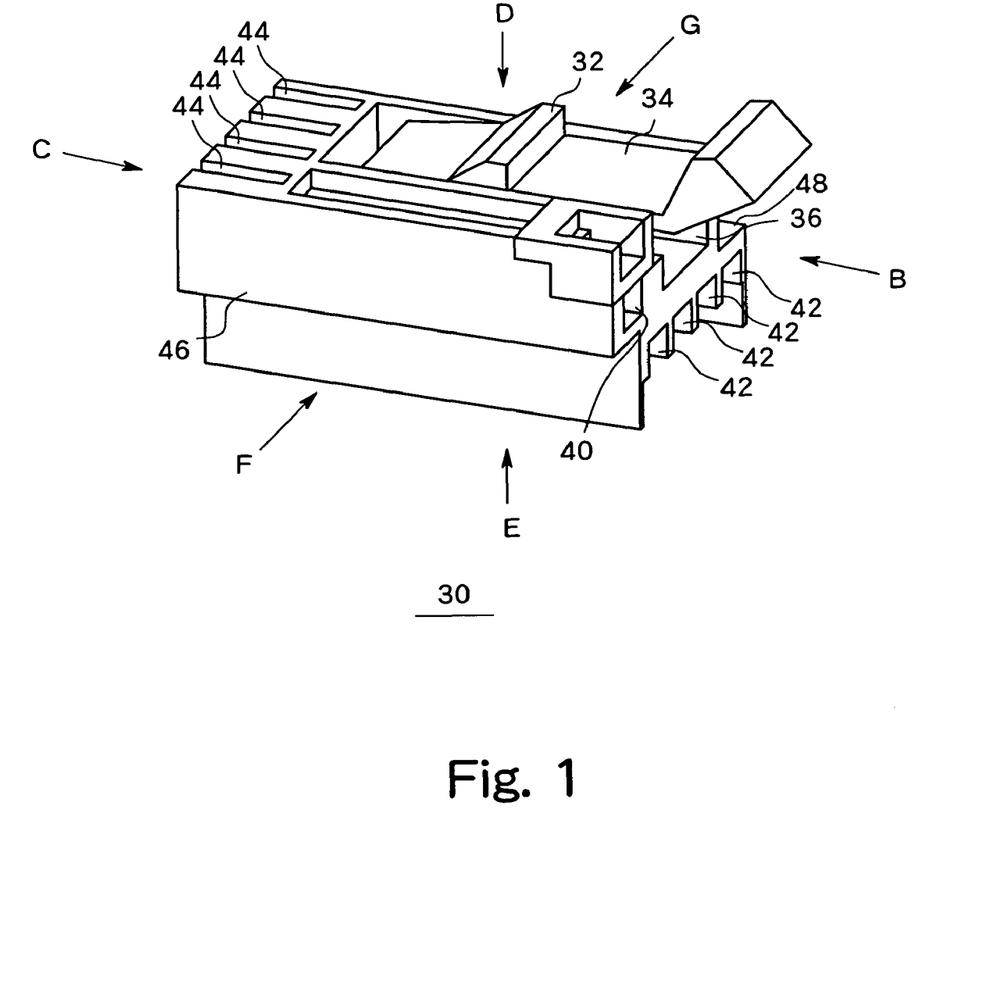
FIG. 1 is a perspective view showing an external appearance of a housing in an embodiment of the present invention.
Figure 2:
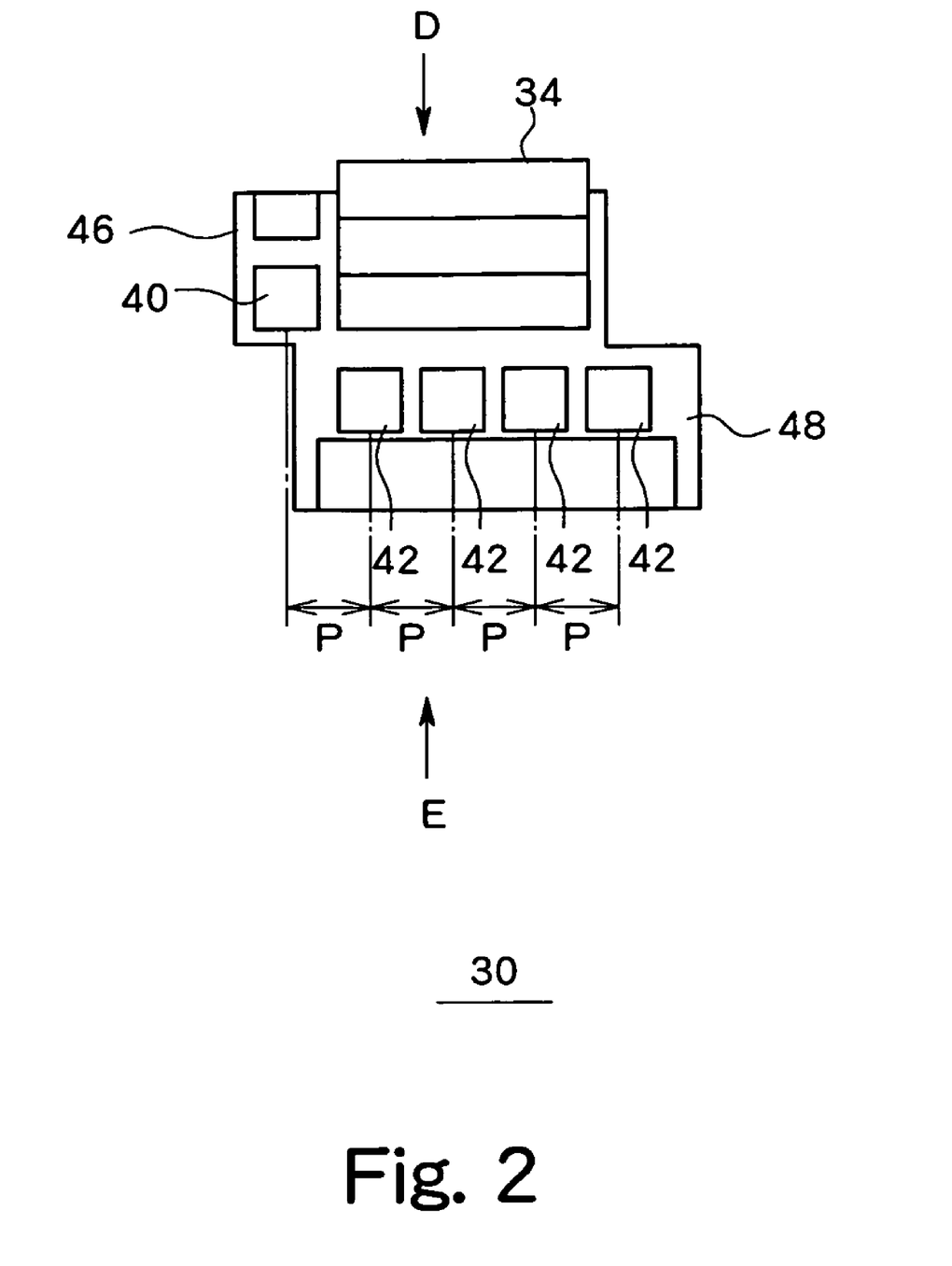
FIG. 2 is a rear side view of the housing in the embodiment of the present invention.
Figure 3:
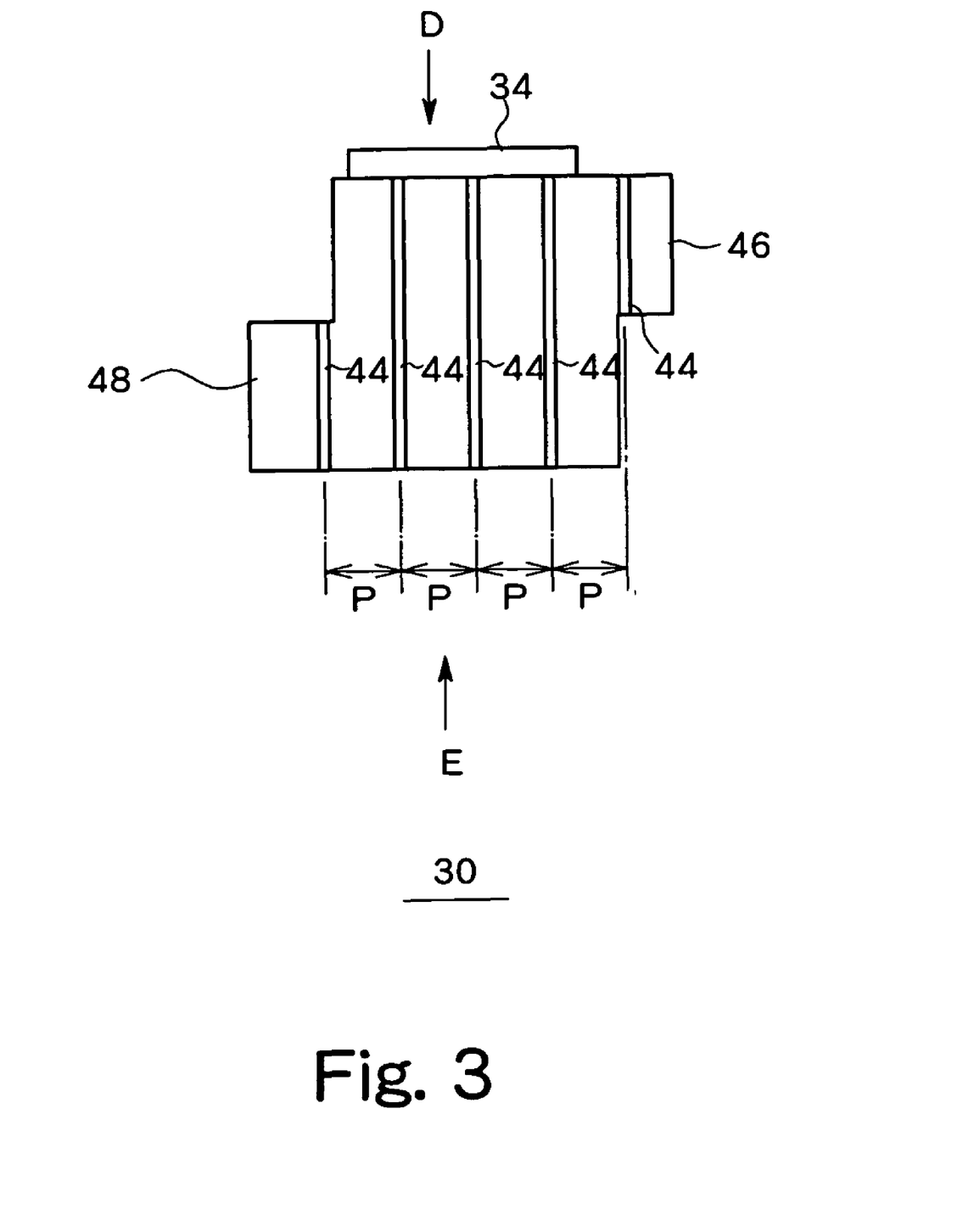
FIG. 3 is a front view of the housing in the embodiment of the present invention.
Figure 4:
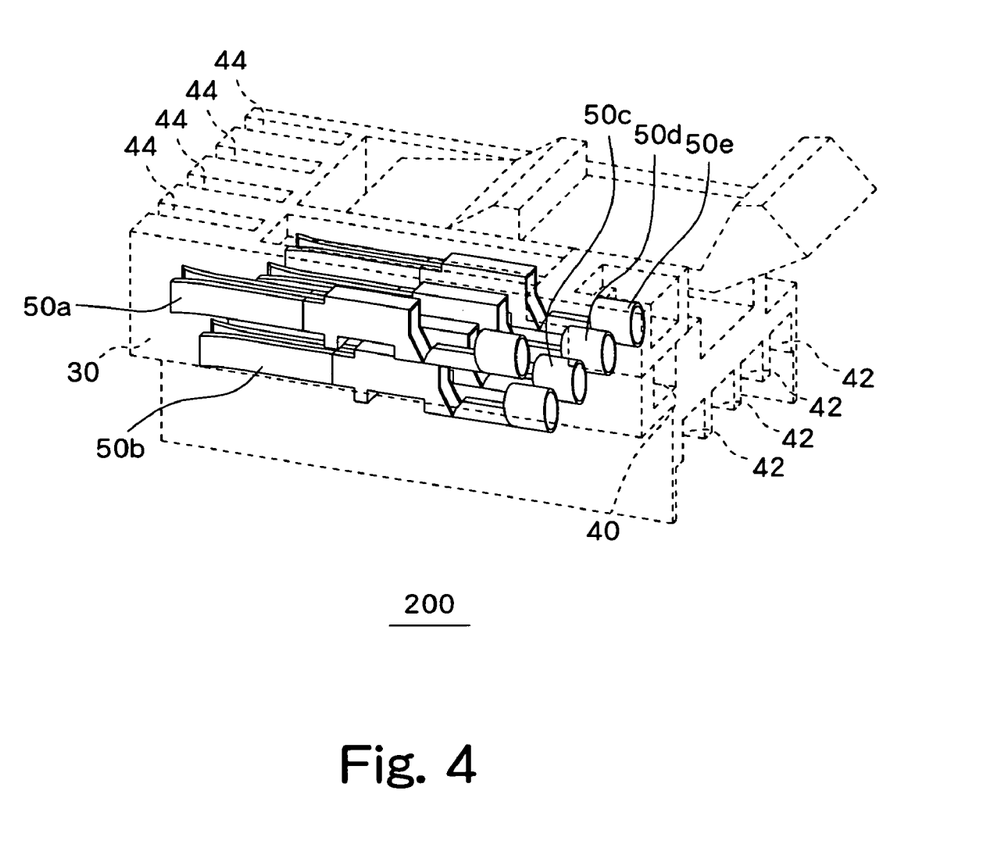
FIG. 4 is a perspective view showing inside of the connecter in the embodiment of the present invention.

In one embodiment of the present invention, a connecter 200 of a fuel cell is constructed comprising a resin housing 30, as shown in FIGS. 1 to 3. FIG. 1 is a perspective view of the housing 30 of the connecter 200, viewed from diagonally above the rear surface B thereof. FIG. 2 is a rear side view of the housing 30 of the connecter 200, viewed from the rear surface B side. FIG. 3 is a front view of the housing 30 of the connecter 200, viewed from the front surface C side. FIG. 4 is a perspective view corresponding to FIG. 1, showing the arrangement of the detection terminals 50 inside the housing 30.

On the upper half of the first lateral surface F of the housing 30, a first projection 46 is formed across the entire width of the first lateral surface F between the front surface C and the rear surface B. On the lower half of the second lateral surface G of the housing 30, a second projection 48 is formed across the entire width of the second lateral surface G between the front surface C and the rear surface B. As shown in the perspective view of FIG. 4, an outermost detection terminal 50a is mounted inside the first projection 46, and a plurality of detection terminals 50b to 50d are mounted inside the lower half of the housing 30 side by side from the first lateral surface F to the second lateral surface G, with the outermost detection terminal 50e mounted inside the second projection 48. The intervals of the detection terminals 50a to 50e is each equal to the stacking pitch P of the single cells of the fuel cell 300 to be described later.

As shown in the rear side view of FIG. 2, openings 40 and 42 are provided in the rear surface B of the housing 30 in conformity with the arrangement of the detection terminal 50a in the upper half and the detection terminals 50b to 50e in the lower half. As shown in the front view of FIG. 3, slits 44 are provided in the front surface C of the housing 30, each by cutting off the portion of the housing 30 between the top surface D and the bottom surface E in conformity with the arrangement of the detection terminals 50a to 50e. The interval between the adjacent slits 44 is equal to the stacking pitch P of the single cells of the fuel cell 300 as described below.

In the connecter 200 in this embodiment, one detection terminal 50a is mounted in the upper half of the housing 30, leaving a space in the upper half of the housing 30 for formation of a lock member 34. Utilizing the space, a lever-like lock member 34 is formed in the upper half of the housing 30. The lock member 34 has an engagement portion 32 projecting upward (the top surface D). The lock member 34 is accommodated in a groove-like lock member holding section 36 defined in the upper half of the housing 30. A part of the lock member 34 is fixed to the housing 30 in the lock member holding section 36 so as to be urged upward. The lock member 34 is an elastic member, and formed integrally with the housing 30. The lock member 34 is fixed such that the convex engagement portion 32 remains projecting above the top surface D of the housing 30 with no external force applied, and that the upper end of the engagement portion 32 dives below the top surface D of the housing 30 with external force applied toward the bottom surface E of the housing 30.

Here, it should be noted that two or more connecters 200 can be mounted such that the intervals of all terminals 50 are equal. When, for example, the pitch of the detection terminals 50 is defined as P, the distance between the center of the terminal accommodation hole in the first projection (the upper half) 46 and the outer surface of the closest housing lateral wall is defined as t1, the distance between the center of the terminal accommodation hole in the second projection (the lower half) 46 and the outer surface of the closest housing lateral wall is defined as t2, and the distance between the center of the terminal accommodation hole (the lower half) closest to the first projection (the upper half) 46 and the outer surface of the closest housing lateral wall is defined as t3, and t2+t3<2P, t1 and t2 can be each defined larger than P. Therefore, even when designing a smaller terminal interval P, it is unnecessary to accordingly reduce the thickness of the housing lateral wall, though the size of the terminal (the accommodation hole) must be considered. Therefore, it is possible to employ a smaller pitch while ensuring required mechanical strength of the housing. It should be noted that it is not necessary for the entire wall to be uniformly thick. That is, in practice, sufficient mechanical strength can be provided a partially thick lateral wall can. For reference, it should be noted that an arrangement in which two or more connecters each having a single row of terminals 50 are arranged, restriction P>=2t is imposed regarding the terminal interval P and the thickness t of the housing lateral wall.

It should further be noted that the structures of the lock member 34 and the lock member holding section 36 are not limited to the configuration described above, and any structure which can reliably fix the connecter 200 to the fuel cell 300, described below, may be employed.

Figure 5:
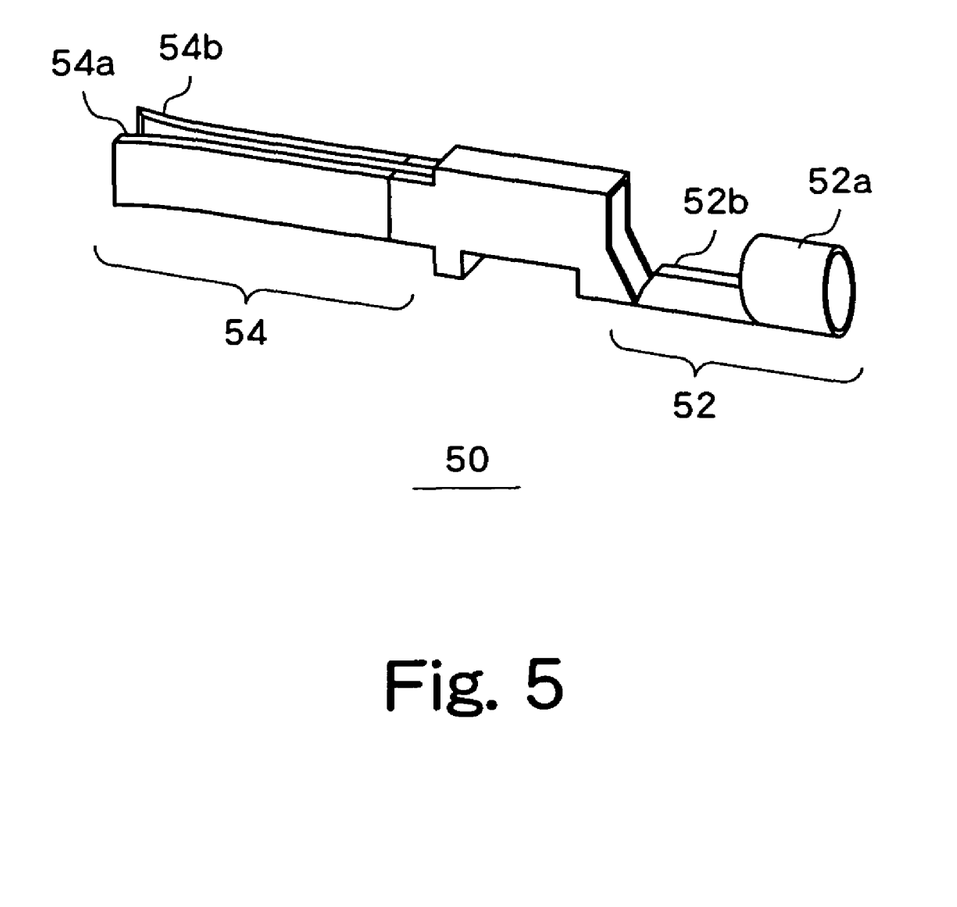
FIG. 5 is a perspective view showing an external appearance of a detection terminal in the embodiment of the present invention.

The detection terminal 50 is made from highly conductive elastic material, such as metal, or the like, with copper alloy generally employed. The detection terminal 50 is constructed comprising an electrical wire crimp portion 52 for connecting an electrical wire, and an electrode contact portion 54 for connection to an electrode of the fuel cell 300 to be described later, as shown in FIG. 5. The electrical wire crimp portion 52 includes an insulation barrel 52a and a wire barrel 52b. The insulation barrel 52a receives and crimps an electrical wire with insulation; the wire barrel 52b receives and crimps a conductor with the insulating coating stripped away.

The electrode contact portion 54 includes two opposed strip (elastic) contact portions 54a and 54b having flat rectangular shape. Preferably, the interval between the contact portions 54a and 54b is defined slightly smaller than the width of the electrode of the single cell of the fuel cell 300. This arrangement ensures reliable electrical connection between the detection terminal 50 and the electrode of the fuel cell 300. Further preferably, the tip ends of the contact portions 54a, 54b are curved outwardly, as shown in FIG. 5. This arrangement can facilitate insertion of the electrode of the fuel cell 300 between the contact portions 54a and 54b.

It should be noted that the structure of the detection terminal 50 is not limited to that described above, and any structure which can be accommodated in the housing 30 and electrically connect an electrical wire to the electrode of fuel cell 300 may be employed. For example, a structure capable of connecting the core wire of an electrical wire by means of pressure is applicable instead of the electrical wire crimp portion 52. The detection terminals 50 for being mounted in the housing 30 may all have the same shape. Therefore, no preparation is required other than preparation of a single type of detection terminals 50.

It should be noted that, although four detection terminals 50b to 50e are arranged in the lower half of the housing 30 in this embodiment, this structure is not an exclusive example, and an increased or reduced number of detection terminals 50, for example, may be arranged in the lower half of the housing 30.

Figure 6:
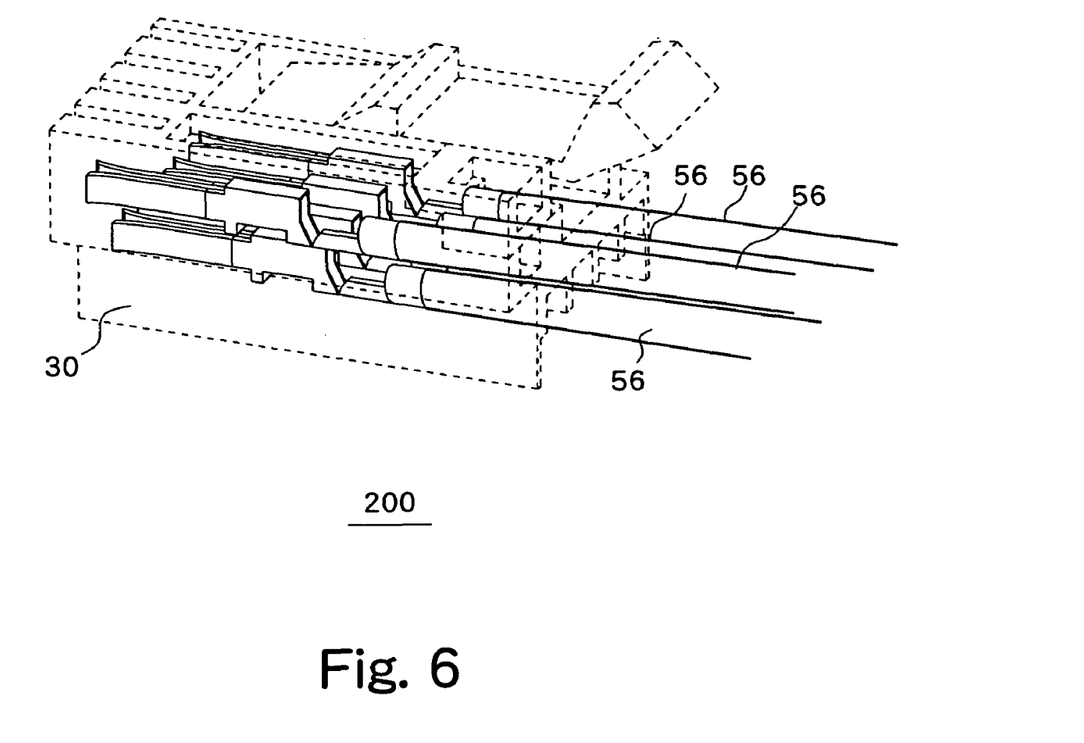
FIG. 6 is a perspective view showing an external appearance of the connecter with an electrical wire connected thereto in the embodiment of the present invention.

FIG. 6 is a perspective view of the connecter 200 with the detection terminals 50 mounted therein, viewed from the above of the rear surface thereof. Specifically, in FIG. 6, the electrical wires 56 are crimped to the detection terminals 50, and pulled out through the openings 40, 42 provided in the rear surface B of the housing 30. The detection terminal 50 is mounted inside the housing 30 with parts of the contact portions 54a, 54b of the electrode contact portion 54 remaining in the slit 44.

Figure 7:
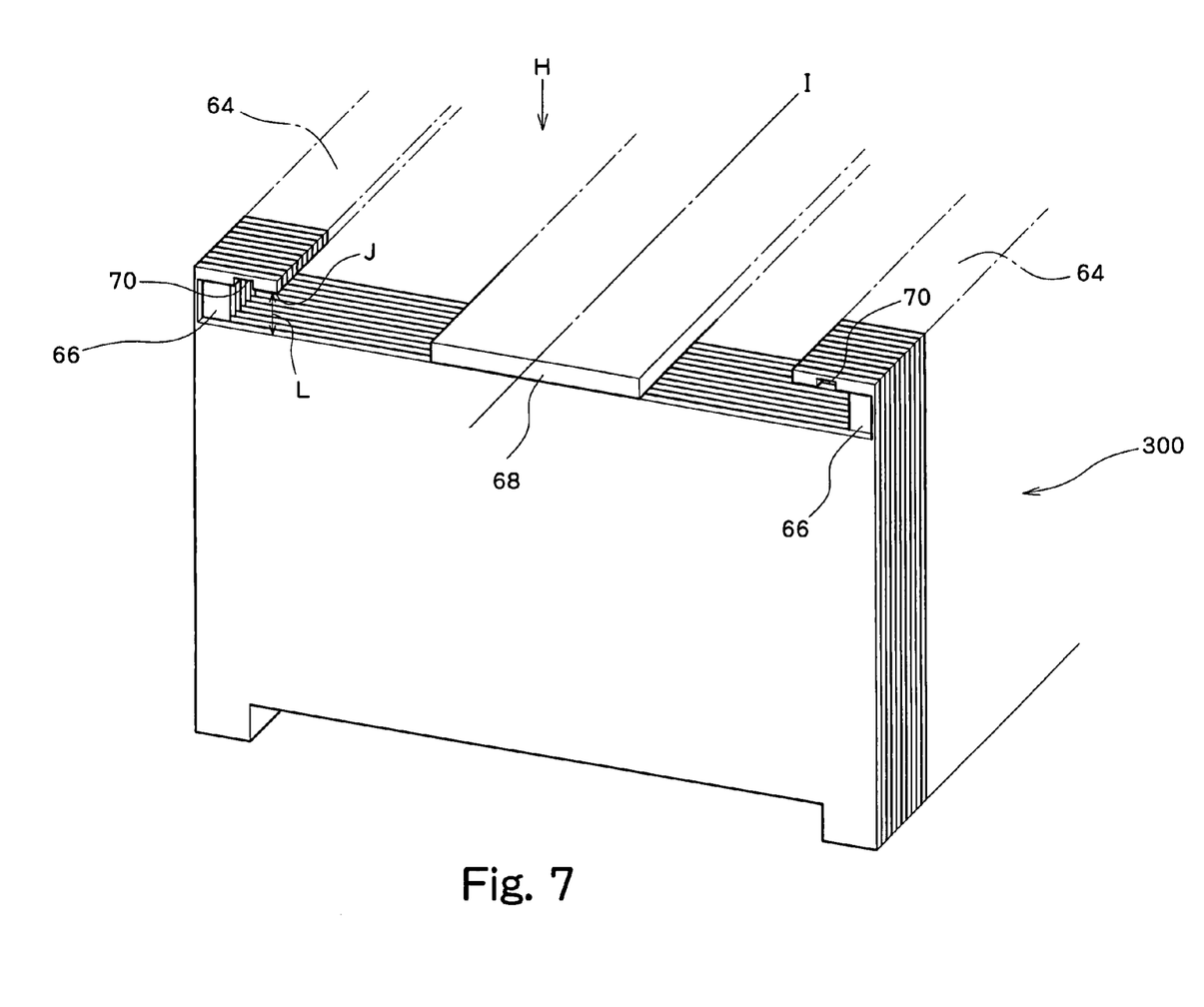
FIG. 7 is a perspective view showing an external appearance of a fuel cell in the embodiment of the present invention.
Figure 8:
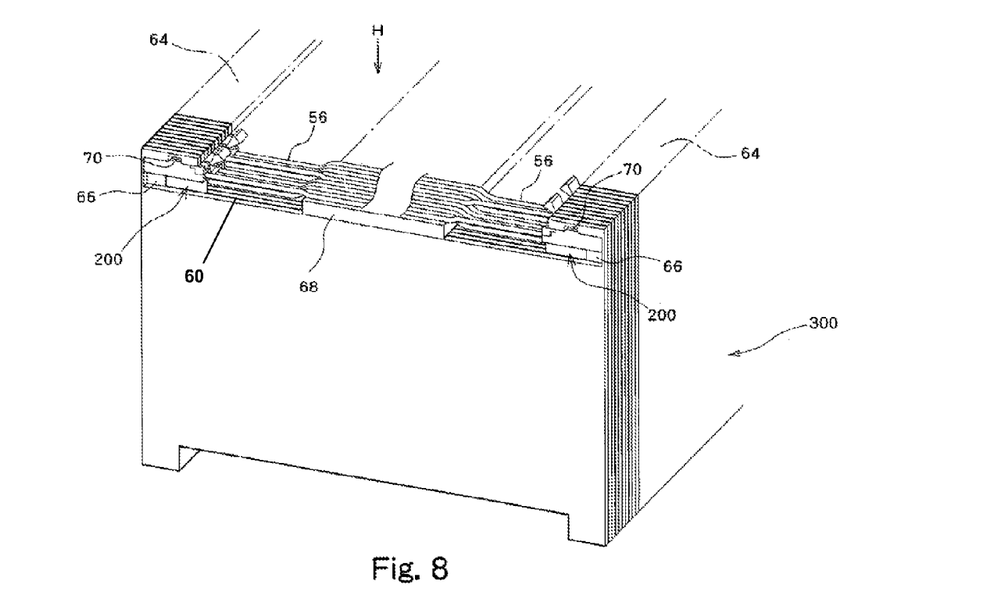
FIG. 8 is perspective view showing an external appearance of the fuel cell with the connecter mounted therein in the embodiment of the present invention.
Figure 9:
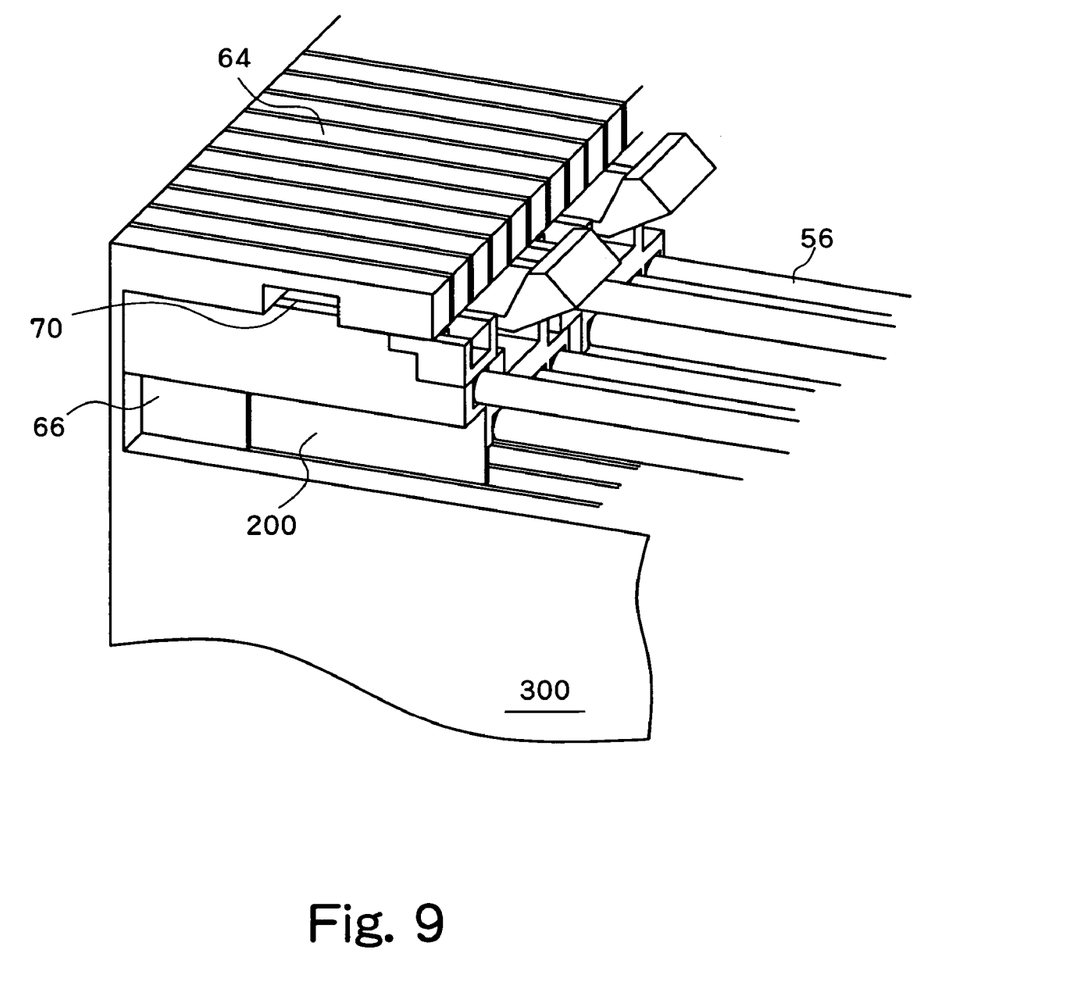
FIG. 9 is an enlarged perspective view of a connecter mounting section of the fuel cell in the embodiment of the present invention.
Figure 10:
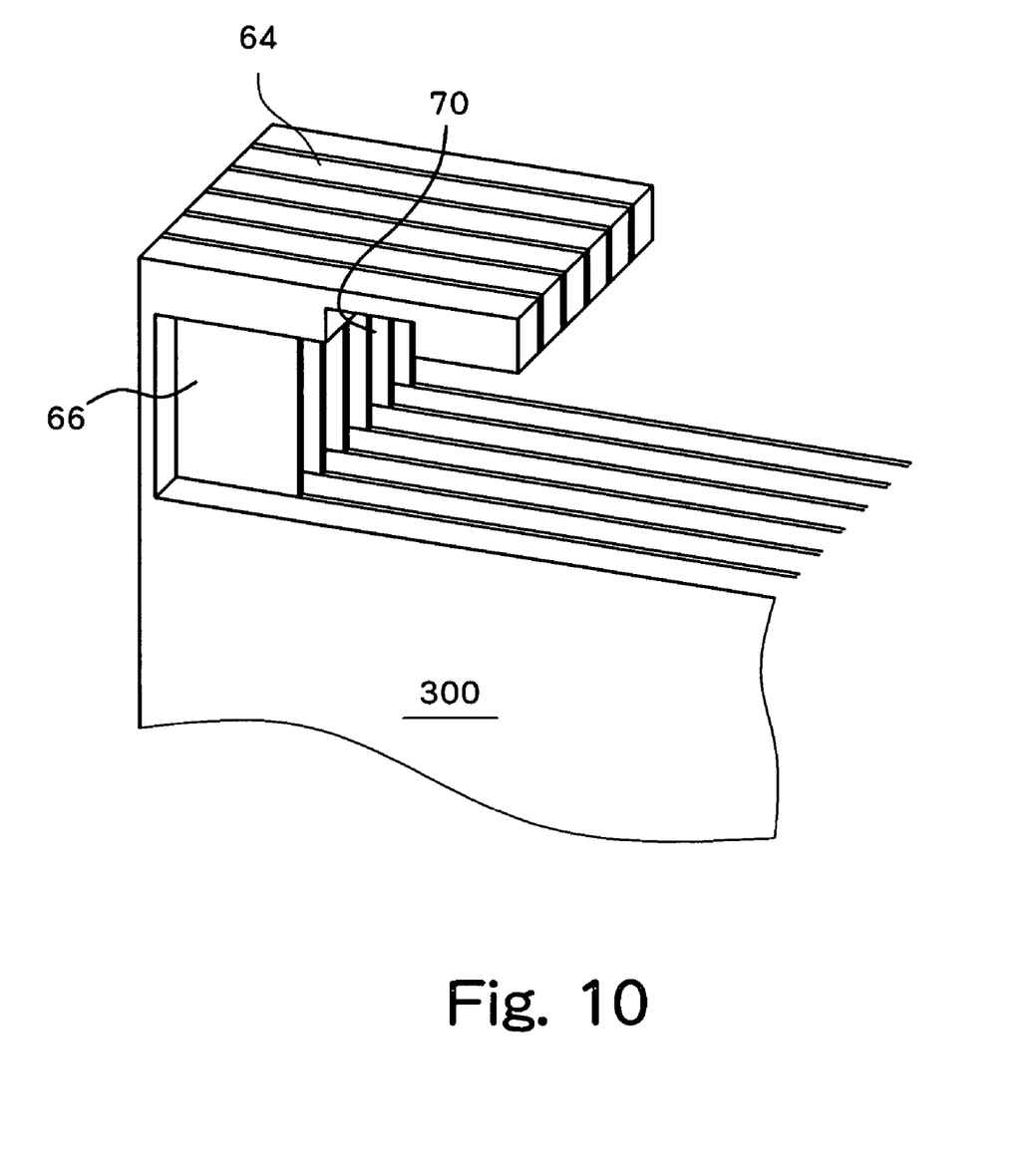
FIG. 10 is an enlarged view showing an external appearance of the fuel cell in the embodiment of the present invention.
Figure 11:
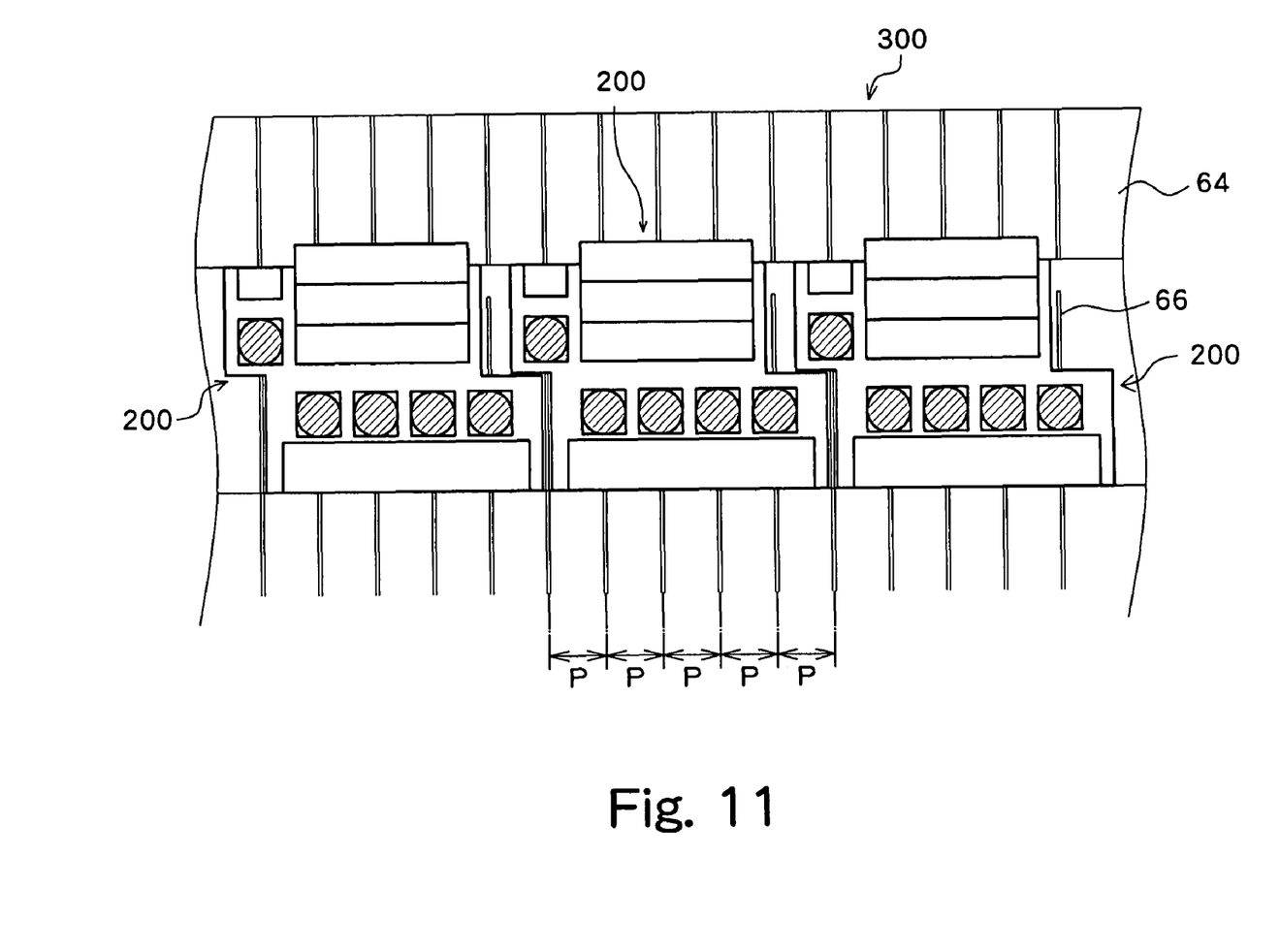
FIG. 11 is a rear side view of the connecter mounting section of the fuel cell in the embodiment of the present invention.

FIG. 7 shows an external appearance of the fuel cell 300 in this embodiment. FIG. 10 is an enlarged view showing a part of the fuel cell 300 in this embodiment. FIG. 8 shows an external appearance of the fuel cell 300 with the connecter 200 mounted therein. FIG. 9 is an enlarged view showing a part of the fuel cell 300, where the connecter 200 is mounted. FIG. 11 is a rear side view of a part of the fuel cell 300, where the connecters 200 are mounted.

The fuel cell 300 is formed by stacking a large number of single cells 60, each serving as a power generation unit. Each of the single cells 60 is formed by sandwiching an electrolyte membrane, or an ion exchange membrane, by an anode and a cathode on both sides thereof, respectively, and further by a pair of separator on the outer side thereof. The single cells 60 are stacked with an interval of a pitch P between the adjacent single cells 60. A path is formed on the separator for supplying fuel gas such as hydrogen gas or the like and oxidant gas such as oxygen gas or the like to the anode and the cathode. The fuel and oxidant gases supplied via the path cause chemical reaction inside each single cell 60, whereby power is generated.

The fuel cell 300 has C-like support sections 64 formed along both side edges of the top surface H thereof. The support section 64 can be formed by forming the resin which constitutes the single cell 60 so as to project upward from the top surface H along the side edge of the fuel cell 300, and further by bending toward the central line I of the top surface H. The distance L between the top surface H of the fuel cell 300 and the bottom surface J of the support section 64 is slightly larger than the difference in height between the top surface D and the bottom surface E of the housing 30 of the connecter 200. A concave hook portion 70 is formed on the inside upper portion of the C-like portion (or on the bottom surface J) of the support section 64.

A metal electrode 66 is formed, projecting upward from the separator of each single cell 60. The electrode 66 is positioned, projecting in the space between the top surface H of the fuel cell 300 and the bottom surface J of the support section 64, closer to the side edge of the fuel cell 300. The interval between the adjacent electrodes 66 is equal to the pitch P as the interval between the adjacent single cells 60 is defined as the pitch P.

It should be noted that, when the support section 64 is made of resin and the electrode 66 is made of metal, enhanced structural strength beyond than that of a conventional single cell is achieved, which allows employment of a smaller pitch P than that in a conventional design, for the single cells 60.

The fuel cell 300 further has a tension plate 68 formed on the top surface H thereof along the central portion thereof, which extends in the direction in which the single cells 60 are stacked. Preferably, the tension plate 68 is made of insulating resin. The tension plate 68 is provided for fixture of the electrical wire 56 pulled out from the detection terminal 50 inside the connecter 200. Use of the tension plate 68 makes it possible to set in array the electrical wires 56 extending over the top surface H of the fuel cell 300.

As shown in FIGS. 8 and 9, the connecter 200 is mounted into the C shaped portion of the support section 64. In the above, the connecter 200 is inserted into the support section 64 via the opening of the C-portion such that the electrode 66 of the single cell 60 is inserted into the slit 44 of the connecter 200. With this arrangement, the electrode 66 is inserted between the contact portions 54a and 54b of each of the detection terminals 50a to 50e located in the slit 44. As a result, the electrodes 66 of the respective single cells 60 are electrically connected to the detection terminals 50a to 50e.

In the above example, the connecter 200 is inserted into the support section 64 from the lateral side thereof such that the engagement portion 32 on the lock member 34 of the connecter 200 is brought into engagement with the hook portion 70 on the support section 64, whereby the connecter 200 is reliably mounted in the fuel cell 300. The engagement between the engagement portion 32 and the hook portion 70 can be released by pressing the tip end of the lock member 34 downward from the bottom surface J of the support section 64 toward the top surface H of the fuel cell 300, thereby allowing the connecter 200 to be removed from the fuel cell 300.

It should be noted that the structure of the hook portion 70 in this embodiment is not limited to the described above, and that any structure which can engage the hook portion 70 and the engagement portion 32 of the lock member 34 of the connecter 200 may be employed.

It should further be noted that two or more connecters 200 can be mounted side by side in the fuel cell 30, and that the connecters 200 can be arranged such that the bottom surface of the first projection 46 of one connecter 200 partly overlaps with the top surface of the second projection 48 of the adjacent connecter 200, as shown in the enlarged view of FIG. 9. That is, the first projection 46 and the second projection 48 of two adjacent connecters 200 may be provided with complementary shapes so that two connecters 200 can be mounted such that the first projection 46 of one connecter 200 is engaged with the second projection 48 of the other. This arrangement enables connection of the electrodes 66 of all single cells 60 of the fuel cell 300 with the detection terminals 50 while avoiding spatial interference between the adjacent connecters 200.

In addition, placement of the lock member 34 in the upper half of the housing 30 where the first projection 46 is formed can prevent the height of the housing 30 from becoming greater than that of a conventional design. Therefore, the overall height of the entire fuel cell system can be made similar to that of the conventional design. Further, the lateral surface of the housing 30 can have an adequate width. This ensures that the required structural strength is provided for the connecter 200.

Because the C-shaped support portion 64 is provided for receiving the connecter 200 being inserted thereinto from the lateral side thereof along the top surface H of the fuel cell 300, the electrode 66, the detection terminal 50, and the connection of the electrical wire 56 are protected from water or the like splashing over the fuel cell 300.

Further, in a structure in which the electrical wire 56 is pulled out in a direction perpendicular to the top surface H of the fuel cell 300, the electrical wire 56 must be bent into the direction along the top surface H of the fuel cell 300, which imposes a mechanical strain on the electrical wire 56, which could eventually lead to parting or breaking of the electrical wire 56.

However, in the connecter 200 in this embodiment, the electrical wire 56 is pulled out from the rear surface B of the connecter 200 and runs along the top surface H of the fuel cell 300, and the connecter 200 is inserted into the support portion 64, headed by the front surface C thereof, along the top surface H of the fuel cell 300. This structure allows the electrical wire 56 to run along the stop surface H of the fuel cell 30 without bending. As a result, breaking or damage of the electrical wire 56 can be prevented.

The invention claimed is:

1. A connecter for connecting an electrical wire to each of electrodes of all single cells contained in a fuel cell formed by stacking a plurality of single cells, comprising:
 a housing having a first projection formed on an upper half of a first lateral surface and a second projection formed on a lower half of a second lateral surface opposed to the first lateral surface;
 a single detection terminal mounted inside the first projection, capable of connection to the electrode of the single cell contained in the fuel cell; and
 at least one detection terminal mounted in the lower half of the housing, capable of connection to the electrode of another single cell contained in the fuel cell.

2. The connecter according to claim 1, further comprising: a lock section formed in the upper half of the housing, for being engaged into a hook section formed on the fuel cell, when mounting the connecter in the fuel cell.

3. The connecter according to claim 1, further comprising: an opening provided in a surface of the housing, perpendicular to a connecter insertion direction, and opposite from a surface which is inserted into the fuel cell, for pulling out therethrough the electrical wire from the detection terminal.

4. The connecter according to claim 2, further comprising: an opening provided in a surface of the surfaces of the housing, perpendicular to a connecter insertion direction, and opposite from a surface which is inserted into the fuel cell, for pulling out therethrough the electrical wire from the detection terminal.

5. A single cell stacking body formed by stacking a plurality of single cells, for being mounted by a connecter for connecting an electrical wire to each of electrodes of the single cells, the connecter including a housing having a first projection formed on an upper half of a first lateral surface and a second projection formed on a lower half of a second lateral surface opposed to the first lateral surface, the single cell stacking body comprising:
 a support section formed using a frame-like resin member sandwiching an outer edge of the single cell, and having a hook section for being engaged with a lock section formed on the connecter; and
 a metal electrode section projecting from the single cell, for connection to a detection terminal of the connecter when the connecter is mounted.

6. The single cell stacking body according to claim 5, wherein the support section has a portion extending in a direction along a surface of the single cell stacking body, where the electrode section is provided.

* * * * *